(12) United States Patent
Coconnier

(10) Patent No.: US 8,899,528 B2
(45) Date of Patent: Dec. 2, 2014

(54) BLADE SEAL

(75) Inventor: Christopher Coconnier, Bristol (GB)

(73) Assignee: Airbus Operations Limited, Bristol (GB)

( * ) Notice: Subject to any disclaimer, the term of this patent is extended or adjusted under 35 U.S.C. 154(b) by 1143 days.

(21) Appl. No.: 12/780,263

(22) Filed: May 14, 2010

(65) Prior Publication Data

US 2010/0288888 A1 Nov. 18, 2010

(30) Foreign Application Priority Data

May 15, 2009 (GB) .................................... 0908354.4

(51) Int. Cl.
*B64C 3/50* (2006.01)
*B64C 9/02* (2006.01)
*B64C 7/00* (2006.01)

(52) U.S. Cl.
CPC ... *B64C 7/00* (2013.01); *B64C 9/02* (2013.01); *Y02T 50/32* (2013.01)
USPC ........... 244/214; 244/130; 244/213; 244/216; 244/210

(58) Field of Classification Search
USPC ........................ 244/130, 213, 214, 216, 210
See application file for complete search history.

(56) References Cited

U.S. PATENT DOCUMENTS

| 4,042,191 | A | | 8/1977 | Johnson |
| 5,839,698 | A | * | 11/1998 | Moppert ....................... 244/217 |
| 6,009,669 | A | * | 1/2000 | Jardine et al. ................... 49/316 |
| 8,360,438 | B2 | * | 1/2013 | Wildman et al. ............. 277/651 |
| 2008/0267770 | A1 | | 10/2008 | Webster et al. |

FOREIGN PATENT DOCUMENTS

| FR | 2907421 A1 | 4/2008 |
| WO | 2005/089186 A2 | 9/2005 |

OTHER PUBLICATIONS

British Search Report for GB0908354.4 dated Sep. 11, 2009.

* cited by examiner

*Primary Examiner* — J. Woodrow Eldred
(74) *Attorney, Agent, or Firm* — Lowe Hauptman & Ham, LLP

(57) ABSTRACT

A blade seal comprises a flexible member having a relatively thick edge opposite a relatively thin edge, and an actuator at least partially embedded in the flexible member for actively deflecting the thin edge with respect to the thick edge upon activation of the actuator. The blade seal may be fixed to an aerodynamic trailing edge of either a fixed aerofoil portion or a flight control surface of an aerofoil for sealing between the fixed aerofoil portion and the flight control surface. Also, a method of sealing an aerofoil using the blade seal.

12 Claims, 4 Drawing Sheets

BLADE SEAL

RELATED APPLICATIONS

The present application is based on, and claims priority from, British Application Number 0908354.4, filed May 15, 2009, the disclosure of which is hereby incorporated by reference herein in its entirety.

FIELD OF THE INVENTION

The present invention relates to a blade seal. The blade seal may be attached to an aerodynamic trailing edge of an aerofoil. The present invention also relates to a method of sealing an aerofoil using a blade seal.

BACKGROUND OF THE INVENTION

Slats are devices on the leading edge of an aircraft wing which are deployed during takeoff and landing to increase the lift of the wing. During landing it is desirable for the slats to be fully deployed for maximum lift. Also, during landing it is desirable to open up a small slot between the slat and the wing fixed leading edge allowing a small amount of high pressure air from the lower surface to reach the upper surface, where it helps postpone the stall. However, during takeoff whilst it is desirable to deploy the slats at least partially to increase lift, it is preferable that there is no slot between the slat and the wing because this increases drag, noise and fuel consumption.

A so called "sealed slat" seals against the wing fixed leading edge when in its retracted (cruise) configuration. The slat is typically carried on slat tracks at either end of the slat so that the trailing edge of the slat closely follows the "D-nose" profile of the wing fixed leading edge. However, in practice, due to the wing span-wise curvature from the in-flight lift forces produced by the wing, a small gap exists in the takeoff configuration between the trailing edge of the slat and the D-nose profile. This is because, at takeoff, the slats are only constrained by the slat tracks at either end of the slat, and not in the middle of the slat. This gap can produce several hundred kilograms of drag overall in the takeoff condition for a commercial airliner.

FIG. 1 illustrates the sealing problems of a sealed slat configuration at takeoff. FIG. 1 is a front view of an aircraft wing 1 at takeoff looking aft. The wing 1 includes a root portion 2 and a tip portion 3. During flight, aerodynamic loads on the wing 1 cause the tip portion 3 to be deflected upwardly and this deflection is shown exaggerated in FIG. 1. The wing 1 includes a fixed aerofoil portion 4 having a fixed leading edge D-nose that runs the full span of the wing. The wing 1 has deployable slats 5 (shown transparent in FIG. 1) mounted to the leading edge of the fixed aerofoil portion 4. The slats 5 are movable between a retracted position in which they are flush with the aerodynamic leading edge of the fixed aerofoil portion 4, and an extended position in which they are deployed forwardly and downwardly so as to open up a slot between the slat 5 and the fixed aerofoil portion 4. The slats 5 are each mounted upon a pair of slat tracks 6 (note only one pair of slat tracks are shown in FIG. 1) which are mounted on rollers in the leading edge of the fixed wing portion 4. The slat tracks 6 are movable within the rollers under the control of the slat actuator mechanism, i.e. slat drive shaft, (not shown) of conventional type.

In the cruise condition, with the slats 5 retracted, the slats 5 are each held down by the slat tracks 6 at each end, and a "hold-down rib" (not shown) on the fixed leading edge at the middle of the slat. However, when the slats 5 are deployed, the slats are only constrained by the slat tracks 6 (i.e. the middle of the slats are no longer held down). Whilst the ends of the slats 5 are constrained by the slat tracks 6, the curvature of the wing 1 due to the aerodynamic forces causes gaps g1 and g2 to be opened up between the trailing edge of the slats 5 and the leading edge of the fixed wing portion 4 in the middle of the slats 5. This gap can reduce aerodynamic performance and lead to increased drag which is undesirable when the wing 1 is in its high lift configuration with the slats 5 deployed. The gaps g1 and g2 may be several millimeters.

One solution would be to adapt the profile of the D-nose such that the sealing between the trailing edge of the slats and the D-nose is improved. Where the span-wise wing curvature is small, profiling the D-nose may be an adequate solution to this sealing problem. However, on larger wing curvatures, especially at the mid and outboard leading edge of the wing, profiling the D-nose may cause the slats to scrape against the D-nose profile as they are retracted.

SUMMARY OF THE INVENTION

A first aspect of the invention provides a blade seal comprising a flexible member having a relatively thick edge opposite a relatively thin edge, and an actuator at least partially embedded in the flexible member for actively deflecting the thin edge with respect to the thick edge upon activation of the actuator.

A second aspect of the invention provides an aerofoil comprising a fixed aerofoil portion, a movable flight control surface, and a blade seal in accordance with the first aspect fixed to an aerodynamic trailing edge of either the fixed aerofoil portion or the flight control surface for sealing between the fixed aerofoil portion and the flight control surface.

A third aspect of the invention provides a method of sealing an aerofoil, the aerofoil comprising a fixed aerofoil portion, a flight control surface movable between an extended and a retracted position with respect to the flight control surface, and a blade seal comprising a flexible member having a relatively thick edge opposite a relatively thin edge and an actuator at least partially embedded in the flexible member, wherein the thick edge of the blade seal is fixed along an aerodynamic trailing edge of either the fixed aerofoil portion or the flight control surface, the method comprising moving the flight control surface from its retracted to its extended position, and activating the blade seal actuator to deflect the thin edge of the blade seal with respect to its thick edge such that the blade seal maintains sealing contact between the fixed aerofoil portion and the flight control surface in the extended position.

This invention is advantageous in that the shape of the blade seal may be manipulated under active control of the actuator embedded therein. The blade seal is operable such that its thin edge can apply an increased sealing force against an adjacent sealing surface when the actuator is activated, so providing an improved seal.

The actuator preferably includes a ribbon of material at least partially imbedded in the flexible member. The ribbon is a relatively thin strip of material with its length dimension oriented substantially perpendicular to the edges of the flexible member. The ribbon is adapted to change shape by bending perpendicular to its surface.

In one embodiment, the ribbon material is a shape memory material. This may be a shape memory alloy, or a shape memory polymer. Shape memory materials assume a nominal shape at a first temperature, and can be deformed to a second desired shape when heated. When the material is cool, the shape memory material will assume its first shape, and when heated to its activation temperature, the shape memory material will assume its second shape. A property of shape memory materials is that they suffer very little fatigue and so this process of heating and cooling so as to change the shape of the shape memory material may be repeated almost indefinitely. In this way, the shape memory material may be used as an actuator. The shape memory material may be heated by radiation or Joule heating. In a preferred embodiment, a heating wire is attached to the shape memory ribbon such that the shape memory ribbon changes shape when the heating wire is energised.

As an alternative to use of shape memory materials, a piezoelectric material may be attached to the ribbon. Piezoelectric materials will change shape when an electric field is applied. Piezoelectric materials typically have a crystal structure. Where the actuator includes piezoelectric material, the ribbon material is preferably a polymer.

The blade seal is preferably elongate with its length dimension substantially parallel with its edges. The blade seal may have a plurality of the actuators provided along its length for actively deflecting the thin edge of the blade seal along its length. The amount of deflection provided by the actuators may vary along the length of the blade seal so that the blade seal may be used to seal a gap of varying dimension along the length of the blade seal.

The blade seal in accordance with this invention may be used to seal between virtually any pair of adjacent structures but is particularly useful where these adjacent structures are movable relative to one another such that a gap to be sealed by the blade seal varies as the structures move relative to one another. For example, the undeflected blade seal may adequately seal between the structures when in a first position but an increased gap between the structures when they are moved to a second position may require deflection of the blade seal to maintain the sealing arrangement.

In a preferred embodiment of the invention, the blade seal is used in an aerospace application according to the second aspect of this invention. Preferably, the flight control surface is an aircraft wing leading edge slat, and the blade seal is fixed to the aerodynamic trailing edge of the slat.

In the method of sealing an aerofoil in accordance with the third aspect of this invention, the method may further comprise moving the flight control surface from its retracted to its extended position to open up a slot between the flight control surface and the fixed aerofoil portion wherein deflection of the blade seal seals one end of the slot formed. The size of the slot formed may vary along its length and the amount of deflection of the thin edge of the blade seal may vary correspondingly along its length so as to maintain the seal along the length of the blade seal.

The flight control surface may be an aircraft wing leading edge slat and the blade seal may be fixed to an aerodynamic trailing edge of the slat.

The blade seal actuator may be activated after initiating movement of the flight control surface from its retracted to its extended position; and the blade seal actuator may be deactivated prior to completion of movement of the flight control surface from its extended to its retracted position. Activation of the blade seal actuator in this way can be used to ensure that the blade seal maintains the seal between the flight control surface and the fixed aerofoil portion during deployment of flight control surface from its retracted to its extended position, whilst also ensuring that the blade seal does not obstruct retraction of the flight control surface when moved from its extended to its retracted position.

BRIEF DESCRIPTION OF THE DRAWINGS

Embodiments of the invention will now be described with reference to the accompanying drawings, in which.

DETAILED DESCRIPTION OF EMBODIMENT(S)

Figure 2:
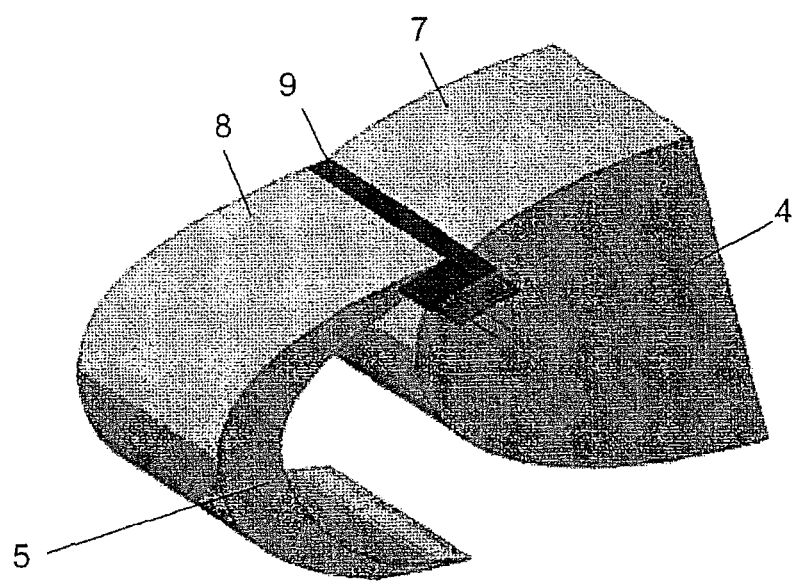
FIG. 2 shows a 3D schematic view of a portion of the aircraft wing leading edge with the slats deployed and showing the blade seal of this invention attached to the slat trailing edge.

As shown in FIG. 2, the fixed aerofoil portion 4 has a D-nose panel 7 which forms the aerodynamic profile of the leading edge of the fixed wing portion 4. The slat 5 has a trailing edge 8 having a resilient blade seal 9 mounted thereto. The blade seal 9 is adapted to seal between the trailing edge 8 of the slat 5 and the D-nose panel 7 of the fixed aerofoil portion 4 as the slat moves between its retracted and extended positions. The slat 5 is shown in its extended position in FIG. 2.

Figure 3:
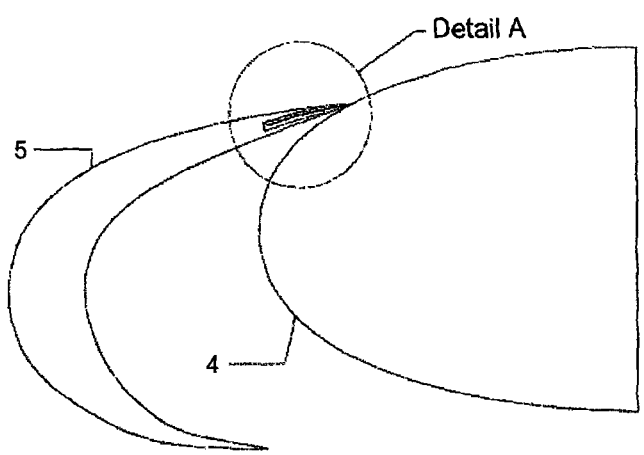
FIG. 3 shows a schematic cross section view through the wing leading edge of FIG. 2.
Figure 4:
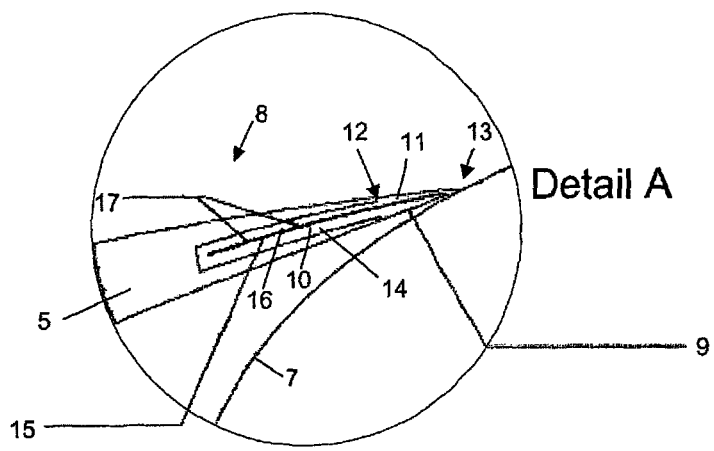
FIG. 4 shows detail A of FIG. 3.

FIG. 3 shows a schematic cross section view through the leading edge of the fixed wing portion 4 and the slat 5. FIG. 4 shows detail A of FIG. 3 of the trailing edge 8 of the slat 5 and the engagement of the blade seal 9 with the D-nose panel 7. The blade seal 9 includes an embedded portion 10 and an exposed portion 11. The embedded portion 10 extends into the structure of the slat trailing edge 8. The exposed portion 11 extends beyond the trailing edge of the slat structure and has a generally wedge shaped configuration with a relatively thick edge 12 opposite a relatively thin edge 13. The thin edge 13 contacts the D-nose panel 7. The embedded portion 10 is fixed to the slat 5. The blade seal 10 comprises a flexible member 14 having an actuator 15 embedded therein for actively deflecting the thin edge 13 with respect to the thick edge 12 upon activation of the actuator 15. The actuator 15 includes a ribbon of shape memory alloy 16 and a pair of heating wires 17 for heating the shape memory alloy 16.

At takeoff when the slats 5 are deployed so as to extend forwardly from the fixed aerofoil portion 4 the blade seal 9 is actuated to seal the gaps g1 and g2 between the D-nose panel 7 and the slat trailing edge 8. Actuation of the blade seal 9 causes the tip 13 of the exposed portion 11 to deflect downwardly such that it makes good sealing contact with the D-nose panel 7. The actuable blade seal 9 is provided along the entire extent of the slat trailing edge 8 of each slat 5. The flexible member 14 provides an effective seal between the slat 5 and the D-nose panel 7. The exposed portion 11 of the flexible member 14 has a wedge shaped taper such that it has an aerodynamic profile to form continuity with the trailing edge 8 of the slat 5.

The ribbon 16 is a two way shape memory alloy having a first shape below its activation temperature, and a second shape above its activation temperature. The heating wires 17 are used to heat the shape memory alloy ribbon 16 by Joule heating to activate the shape memory alloy. The shape memory alloy is trained through heat treatment to obtain the desired shape. The shape memory alloy ribbon 16 may be a readily available Titanium-Nickel alloy. At room temperature it will have a nominal shape. By heating the shape memory alloy to around 500° C. and bending the shape memory alloy at that temperature to a desired activation shape and then subsequently cooling the shape memory alloy, the shape memory alloy can be trained to have an activation shape. The activation temperature of selected the Titanium-Nickel alloy is around 100° C. (Note that different grades exist with different activation temperatures). Below this activation temperature, the shape memory alloy ribbon 16 will assume its nominal shape. When heated above this activation temperature, the shape memory alloy ribbon will assume its activated shape. The heating wires 17 have sufficient power to heat the shape memory alloy ribbon 16 above its activation temperature rapidly. The ribbon 16 retrieves its nominal shape as soon as current in the heating wires 17 ceases.

Figure 1:
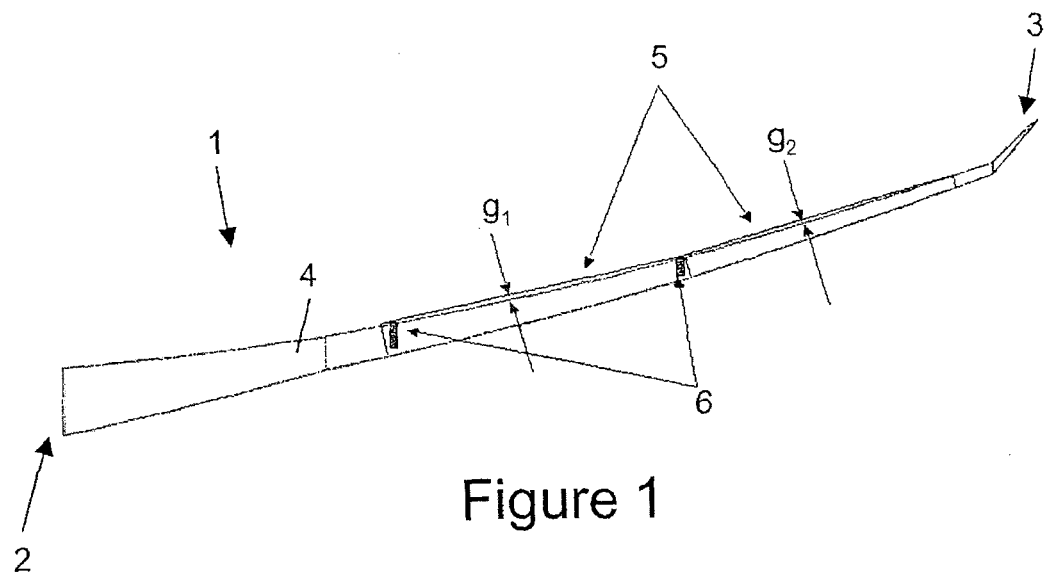
FIG. 1 illustrates schematically an aircraft wing having leading edge slats viewed looking aft, the wing being shown deflected upwardly under aerodynamic load with the slats deployed forwardly in a takeoff configuration and showing the span-wise variation in gap between the slats an the wing leading edge.

The amount of deflection required of the shape memory alloy ribbon 16 is determined by the size of the gap the blade seal 9 needs to close to effectively seal against the D-nose panel 7. As discussed above with reference to FIG. 1, the gaps g1 and g2 are greatest at the midpoint of the slats 5 and vary from a minimum adjacent slat tracks 6 to a maximum at the midpoint at the slats 5. The amount of deflection is typically around 1 mm to 3 mm but may be 5 mm or more. The deflection upon activation of the shape memory alloy ribbon 16 can be accurate to within one millimeter by the above described curing process, and flexibility from the flexible member 14 gives allowances.

Figure 5:
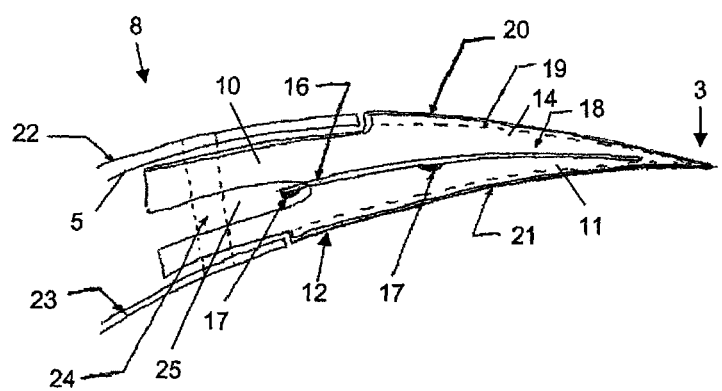
FIG. 5 shows a detailed cross section view of the blade seal.

The construction of the blade seal 9 will be described in more detail below with reference to FIG. 5. The flexible member 14 is manufactured in a mould the length of the slat trailing edge 8. The flexible member 14 has a core 18 which may be, for example, general purpose silicon ABR0080 with a hardness of around 60IRHD. The core 18 is layered with reinforcing fabrics 19, such as ABR9-0142 type. The flexible member 14 is covered in a protective layer 20, such as polyurethane ABR4-0177, for extra protection and smoothness on its outer surface. The lower outer surface is covered with an additional layer of friction reducing material 21, such as polyurethane or fabric ABR9-0142. The upper outer layer may additionally be covered with, for example, a glass ply (not shown) for improved stiffness and smoothness.

The flexible member 14 is fixed to the upper and lower Aluminium skins 22, 23 respectively of the slat trailing edge 8 by bolts 24 at numerous locations span-wise across the slat trailing edge 8.

A plurality of the actuators 15 are provided at discrete locations spaced span-wise along the length of the blade seal 9. Each actuator 15 includes a shape memory alloy ribbon 16, although the ribbons need not be identical. For instance, the shape memory alloy ribbons 16 may be of the same material and have the same exterior dimensions but the degree of deflection in the activated shape may be different between those ribbons towards the ends of the blade seal 9 to those at the middle of the blade seal 9. In this way, the blade seal 9 may be tailored along its length to ensure that the correct amount of deflection is provided sufficient to seal between the slat 5 and the fixed aerofoil portion 4, without imposing unnecessary stress on the structures.

The heating wires 17 are bonded to the shape memory alloy ribbons 16 using a high temperature epoxy, for example. A single heating wire 17 may be sufficient to activate the shape memory alloy ribbons 16. However, in the preferred embodiment described above, the embedded portion 10 of the flexible member 14 has a bifurcated structure forming a recess 25 and a second heating wire 17 is bonded to an exposed end of each of the shape memory alloy ribbons 16. The second heating wire 17 provides for redundancy and this second heating wire 17 is visible, accessible and therefore replaceable, so improving the reliability and maintenance performance of the actuable blade seal 9.

Operation of the actuable blade seal 9 will now be described in detail. The leading edge slats 5 are deployed to their extended position during both takeoff and landing phases of an aircraft flight. During the landing phase, the slats 5 are fully deployed whereby a substantial slot is created between the trailing edge 8 of the slats 5 and the fixed aerofoil portion 4. It is generally not desirable or practicable to seal this slot in the landing phase. In the takeoff phase, the slats 5 are only partially deployed and so only a small deflection of the blade seal 9 is required to effectively seal the trailing edge 8 of the slats 5 against the fixed aerofoil portion 4 sealing the slats 5 in the takeoff configuration leading to enhanced lift performance, and reduced drag, noise and fuel consumption. Therefore, the actuable blade seals 9 are only activated so as to deflect the thin edge 13 of the blade seal during the takeoff flight phase.

When the slats 5 are in their retracted position, the actuators 15 in the blade seals 9 are deactivated and the flexible member 14 forms an adequate seal between the slat trailing edge 8 and the D-nose panel 7 of the fixed aerofoil portion. As the aircraft is readied for takeoff, the slats 5 are deployed forwardly to their partially extended position. During movement of the slats 5 to their partially extended position, a gap begins to open up between the blade seal 9 and the D-nose panel 7. The actuators 15 are then activated by energising the heating wires 17 which heats the shape memory alloy ribbons 16 above their activation temperature so that they quickly deform to their activated shape. In their activated shape, the shape memory alloy ribbons 16 cause the thin edges 13 of the blade seals 9 to deflect downwardly towards the upper surface of the D-nose panel 7, so sealing these gaps. The shape memory alloy ribbons 16 respond rapidly, but smoothly when the heating wires 17 are energised and so simultaneous slat deployment and actuation of the blade seal is possible. At the end of the takeoff phase, the blade seal actuators 15 are deactivated just prior to retraction of the slats 5 so as to avoid excessive wear or clash between the blade seals 9 and the D-nose profile 7.

Figure 6:
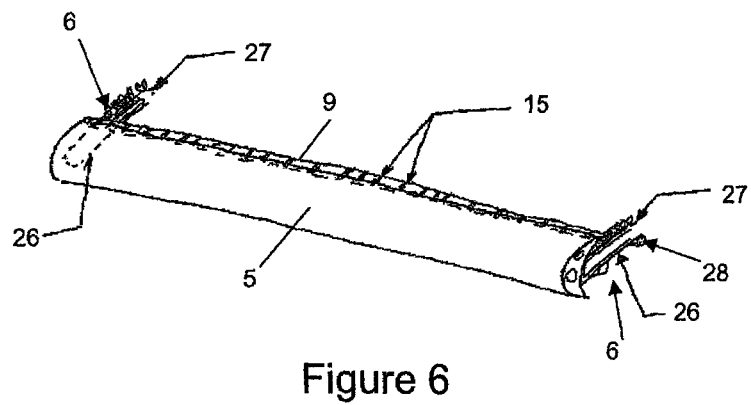
FIG. 6 shows a 3D view of the slat with the trailing edge blade seal having a plurality of actuator ribbons embedded therein and spaced span-wise along its length, and showing the electrical power supply cables for the blade seal actuator connected to the slat tracks at either end of the slat.
Figure 7:
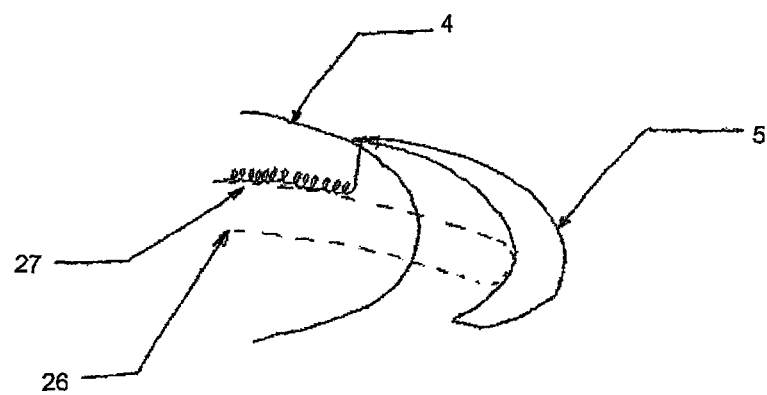
FIG. 7 shows a schematic cross section view of the slat leading edge in the vicinity of the slat track showing the electrical power supply connection.

FIG. 6 shows one of these slats 5 mounted upon conventional slat tracks 6 provided at each end of the slat. The slat tracks essentially comprise a beam 26 supported upon rollers 28 mounted in the leading edge of the fixed aerofoil portion 4. The aircraft wing 1 will include a plurality of power and signal wiring routes running along the fixed aerofoil leading edge structure just behind the D-nose panel 7. The D-nose panel 7 has apertures to receive the slat tracks 6 and electrical power supply wiring routes connect the electrically actuated blade seal 9 to these power and signal wiring routes by means of coiled electrical cables 27. Since these electrical cables 27 are coiled, they can accommodate movement of the slat 5 between its retracted and extended positions whilst maintaining reliable electrical connection between the fixed aerofoil portion 4 and the slat 5. A cross section view of the slat 5 showing the slat track beam 26 and the coiled electrical cable 27 is shown in FIG. 7.

As an alternative to use of shape memory alloy ribbons for the actuator, shape memory polymer ribbons may be used in the alternative. The shape memory polymer ribbons may be activated by heating, using heating wires in a similar manner to the shape memory alloy ribbons of the preferred embodiment described above. The activation temperature of shape memory alloys and shape memory polymers could be anywhere in the temperature range 30° C. to 120° C., depending on operational requirements.

In an alternative embodiment, the blade seal includes one or more piezoelectric actuators. The piezoelectric actuator may include piezoelectric material fixed on a polymer ribbon, which will bend by the required amount according to the electrical power supplied to the piezoelectric material. The piezoelectric actuator is embedded in a flexible member of the blade seal in a similar manner to the preferred embodiment described above. According to the size of the gap at the slat trailing edge, the piezoelectric actuators will be tailored to different resistances to provide the necessary voltage to cause sufficient bending of the ribbon to push the flexible member down to seal that gap. The piezoelectric material may be quartz crystal, for example.

Whilst the blade seals in the embodiments described above have been described as applied to the trailing edge of an aircraft slat, it will be appreciated by those skilled in the art that the blade seal may similarly be applied to other aerospace and non-aerospace applications. For example, the blade seal may be attached to the fixed trailing edge of an aircraft wing for sealing against an aileron, for example. The blade seal of this invention may be used to seal between virtually any pair of movable structures.

Although the invention has been described above with reference to one or more preferred embodiments, it will be appreciated that various changes or modifications may be made without departing from the scope of the invention as defined in the appended claims.

The invention claimed is:

1. An aircraft wing comprising a fixed aerofoil portion and a leading edge slat movable between an extended position and a retracted position with respect to the fixed aerofoil portion, the leading edge slat having a blade seal fixed to an aerodynamic trailing edge of the leading edge slat, wherein the blade seal comprises
   a wedge shaped flexible member having a relatively thick edge opposite a relatively thin edge, and
   an actuator at least partially embedded in the flexible member for actively deflecting the thin edge with respect to the thick edge upon activation of the actuator, and wherein the slat is movable between:
   a first configuration in which the leading edge slat is in said retracted position and the blade seal seals against the fixed aerofoil portion;
   a second configuration in which the leading edge slat is in said extended position and a slot is open between the leading edge slat and the fixed aerofoil portion; and
   a third configuration in which the leading edge slat is in an intermediate position between said extended position and said retracted position and the blade seal actuator is activated to deflect the thin edge of the blade seal towards the fixed aerofoil portion to seal an upper end of a slot between the leading edge slat and the fixed aerofoil portion.

2. An aircraft wing according to claim 1, wherein the actuator includes a ribbon of material at least partially embedded in the flexible member.

3. An aircraft wing according to claim 2, wherein the ribbon material is a shape memory material.

4. An aircraft wing according to claim 3, further comprising a heating wire attached to the shape memory ribbon, wherein the shape memory ribbon is adapted to change shape when the heating wire is energized.

5. An aircraft wing according to claim 2, further comprising a piezoelectric material attached to the ribbon, wherein the ribbon material is adapted to change shape when the piezoelectric material is energized.

6. An aircraft wing according to claim 5, wherein the ribbon material is a polymer.

7. An aircraft wing according to claim 1, wherein the blade seal is elongate and has a plurality of the actuators provided along its length for actively deflecting the thin edge of the blade seal along its length.

8. An aircraft wing according to claim 7, wherein the amount of deflection provided by the actuators varies along the length of the blade seal.

9. A method of operating an aircraft wing, the aircraft wing comprising a fixed aerofoil portion and a leading edge slat movable between an extended position and a retracted position with respect to the fixed aerofoil portion, and a blade seal comprising a wedge shaped flexible member having a relatively thick edge opposite a relatively thin edge and an actuator at least partially embedded in the flexible member,
   wherein the thick edge of the blade seal is fixed along an aerodynamic trailing edge of the leading edge slat, the method comprising moving the leading edge slat between:
   a first configuration in which the leading edge slat is in said retracted position and the blade seal seals against the fixed aerofoil portion;
   a second configuration in which the leading edge slat is in said extended position and a slot is open between the leading edge slat and the fixed aerofoil portion; and
   a third configuration in which the leading edge slat is in an intermediate position between said extended position and said retracted position and the blade seal actuator is activated to deflect the thin edge of the blade seal towards the fixed aerofoil portion to seal an upper end of a slot between the leading edge slat and the fixed aerofoil portion.

10. A method according to claim 9, wherein the size of the slot formed in the third configuration varies along its length, and wherein the amount of deflection of the thin edge of the blade seal varies correspondingly along its length so as to maintain the seal along the length of the blade seal.

11. A method according to claim 9, wherein the blade seal actuator is activated after initiating movement of the leading edge slat from said retracted position to said intermediate position.

12. A method according to claim 9, wherein the blade seal actuator is de-activated prior to completion of movement of the leading edge slat from said intermediate position to said retracted position.

* * * * *